United States Patent [19]
Freiman et al.

[11] Patent Number: 5,726,554
[45] Date of Patent: Mar. 10, 1998

[54] CHARGING A BATTERY HAVING A NOMINAL CRITICAL TERMINAL VOLTAGE

[75] Inventors: Joseph F. Freiman, Cypress; Steven Kent McConkey, Houston; Nathan Austin Mitchell, The Woodlands, all of Tex.

[73] Assignee: Compaq Computer Corporation, Houston, Tex.

[21] Appl. No.: 653,193

[22] Filed: May 24, 1996

[51] Int. Cl.$^6$ .................. H01M 10/44; H01M 10/46
[52] U.S. Cl. .................. 320/21; 320/22; 320/30
[58] Field of Search .................. 320/5, 14, 19, 320/21, 22, 29, 30, 32, 39

[56] References Cited

U.S. PATENT DOCUMENTS

| | | | |
|---|---|---|---|
| 3,944,904 | 3/1976 | Hase | 320/21 X |
| 4,354,148 | 10/1982 | Tada et al. | 320/20 |
| 5,307,000 | 4/1994 | Padrazhansky et al. | 320/14 |
| 5,367,244 | 11/1994 | Rose et al. | 320/23 |
| 5,408,170 | 4/1995 | Umetsu et al. | 320/39 |
| 5,442,274 | 8/1995 | Tamai | 320/39 X |
| 5,523,671 | 6/1996 | Stewart | 320/39 |

*Primary Examiner*—Edward Tso
*Attorney, Agent, or Firm*—Fish & Richardson, P.C.

[57] ABSTRACT

A battery pack of a computer system includes a battery having a nominal critical terminal voltage that may not be exceeded without hazardous failure of the battery. The battery pack includes a controller for routing power from an external power source to the battery to recharge the battery. The controller is configured to apply a time profile of charging power to the terminals of the battery. The profile includes time portions when the terminal voltage of the battery exceeds the nominal rated critical terminal voltage. The controller is also configured to control the time profile to prevent hazardous failure of the battery.

34 Claims, 8 Drawing Sheets

VARIATIONS OF THE PULSE ROUTINE

| Algorithm | $T_{ON}$ | $T_{OFF}$ | $T_{DUTY}$ |
|---|---|---|---|
| A | Dependent Variable | Independent Variable | Fixed |
| B | Variable | Variable | Variable |
| C | Independent Variable | Dependent Variable | Fixed |
| D | Dependent Variable | Fixed | Independent Variable |
| E | Independent Variable | Fixed | Dependent Variable |
| F | Fixed | Independent Variable | Dependent Variable |
| G | Fixed | Dependent Variable | Independent Variable |

FIG. 9

CHARGING A BATTERY HAVING A NOMINAL CRITICAL TERMINAL VOLTAGE

BACKGROUND

The invention relates to charging a battery.

Figure 1:
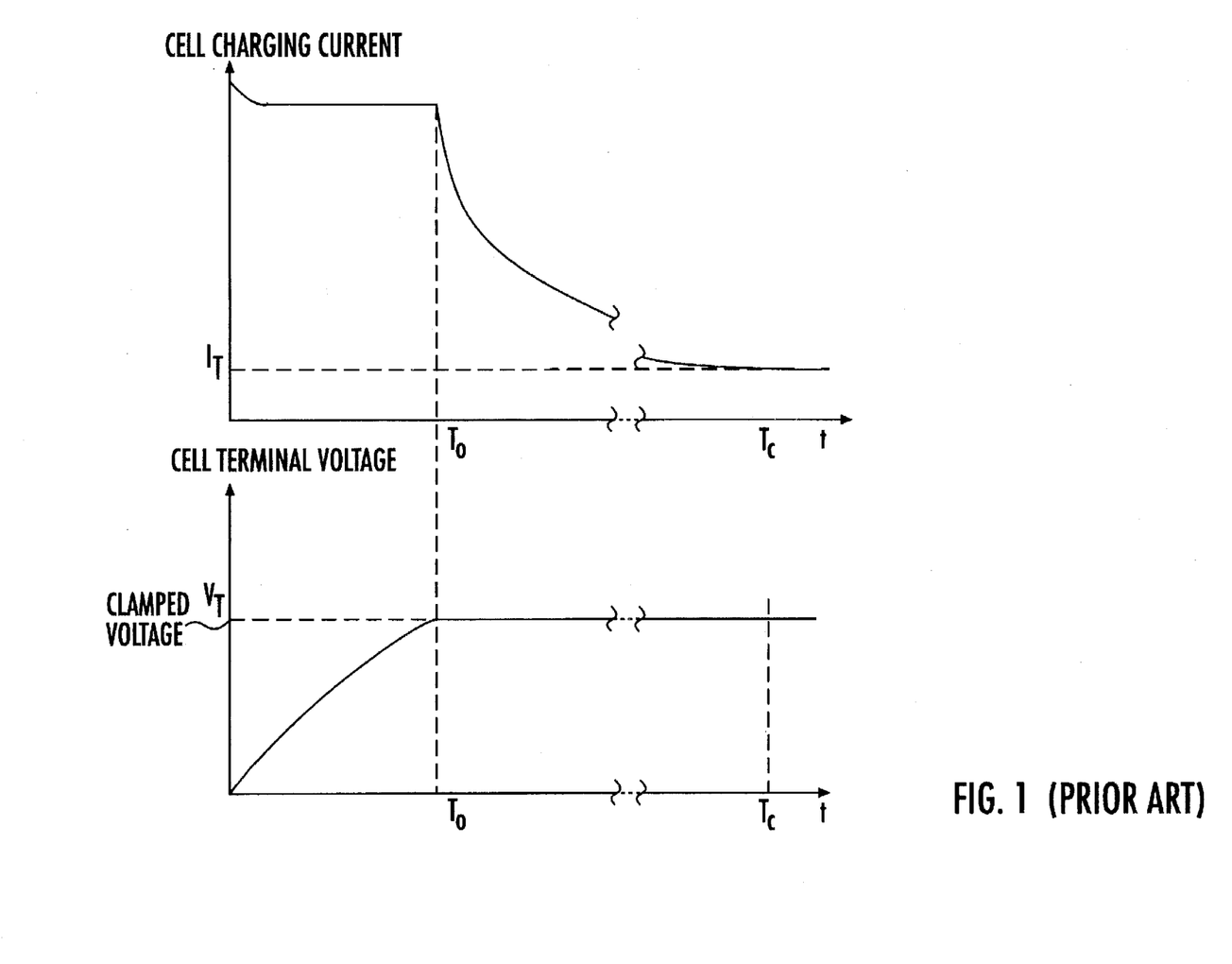
FIG. 1 are graphs showing waveforms for a battery cell being charged.

As shown in FIG. 1, a typical circuit for charging a lithium ion battery cell, for example one encased in a battery pack of a portable computer, allows a terminal voltage of the cell being charged to increase until the terminal voltage equals a manufacturer-specified critical (for safety) voltage threshold level $V_T$ at time $T_O$. When this occurs, the charging circuit limits, or clamps, the otherwise rising terminal voltage to the voltage level $V_T$ and a cell charging current begins decreasing. When the charging current falls to a predetermined current threshold level $I_T$ at time $T_C$, the cell is deemed fully charged.

SUMMARY

In general, in one aspect, the invention features a method of charging a battery. The battery has a nominal rated critical terminal voltage that may not be exceeded without hazardous failure of the battery. A time profile of charging power is applied to the terminals of the battery. The profile includes time portions when the terminal voltage of the battery exceeds the nominal rated critical terminal voltage, and the time profile is controlled to prevent hazardous failure of the battery.

Implementations of the invention may include one or more of the following features. The step of controlling may include repeatedly cycling the charging voltage from higher levels that exceed the nominal rated critical terminal voltage to lower levels that are no higher than the nominal rated critical terminal voltage.

The lower levels may represent a relaxation voltage that rises over time to reach the nominal rated critical terminal voltage. The time profile may include a series of current pulses each comprising an on period and an off period, and the off period may end each time the terminal voltage of the battery falls to the relaxation voltage. The current pulses may all have the same duty cycle, and the lengths of the on periods may decrease with time. The step of controlling the time profile may include monitoring the terminal voltage of the battery during charging and controlling the time profile based on the monitored terminal voltage.

In general, in another aspect, the invention features a method of charging a lithium ion battery using pulses of current.

In general, in another aspect, the invention features measuring a relaxation voltage of the battery at times during charging and continuing the time profile until the relaxation voltage reaches a predetermined level.

In general, in another aspect, the invention features a personal electronic device, for example, a portable computer, capable of receiving power from an external power source. The device includes a microprocessor and a rechargeable battery pack. The battery pack includes a battery having a nominal critical terminal voltage that may not be exceeded without hazardous failure of the battery. The battery pack includes a controller for routing power from the power source to the battery to recharge the battery. The controller, which may include a microprocessor, is configured to apply a time profile of charging power to the terminals of the battery in the personal electronic device. The profile includes time portions when the terminal voltage of the battery exceeds the nominal rated critical terminal voltage. The controller is configured to control the time profile to prevent hazardous failure of the battery in the personal electronic device.

Implementations of the invention may include one or more of the following features. The controller may include a microprocessor. The controller may include switches. The controller may include a voltage detector. The personal electronic device may be a personal computer.

In other aspects, the features are incorporated in a personal electronic device which includes a microprocessor and a rechargeable battery pack.

Among the advantages of the invention may be one or more of the following. A precisely controlled voltage limited power source is not required, reducing cost and complexity. Charge accumulates in the cells faster which reduces the charging time.

Other advantages and features will become apparent from the following description and from the claims.

DETAILED DESCRIPTION OF THE PREFERRED EMBODIMENTS

Figure 2:
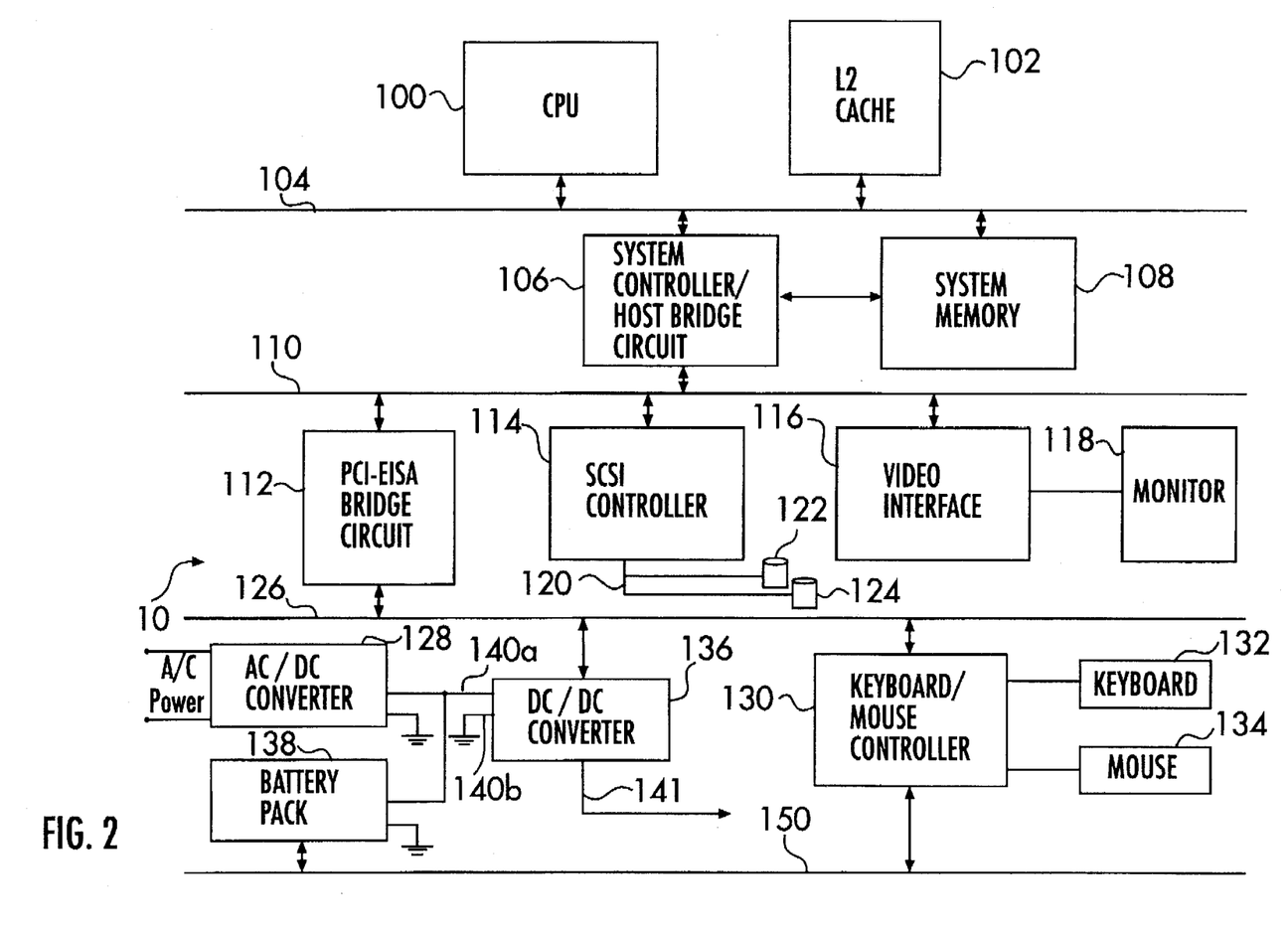
FIG. 2 is a block diagram of a computer system.
Figures 4, 5:
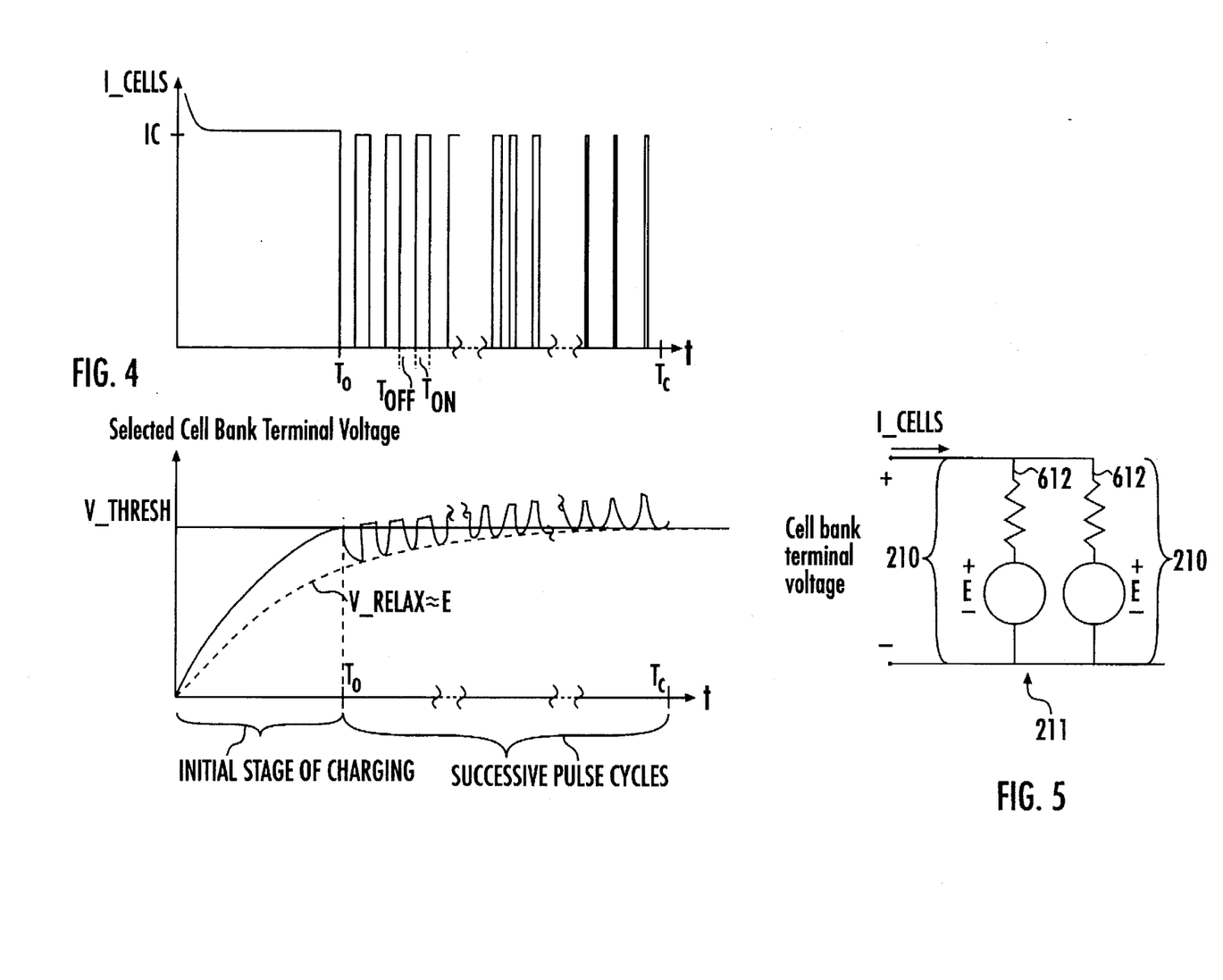
FIG. 4 are graphs showing waveforms for a battery cell being charged.
FIG. 5 is an equivalent circuit diagram of a pair of battery cells.

As shown in FIGS. 2 and 4–5, unlike a conventional lithium ion cell charging system, a battery pack 138 of a portable computer system 10 uses pulses to charge eight lithium ion battery cells 210 of the battery pack 138 in a way that does not directly limit the terminal voltages of the cells 210 being charged. Therefore, circuitry to tightly regulate the terminal voltages of the cells 210 being charged is not required.

The computer system 10 includes a central processing unit (CPU) 100, a level two (L2) cache 102 and a system memory 108, all which are coupled to a local bus 104. A system controller/host bridge circuit 106 controls access to the system memory 108 and interfaces the local bus 104 to a Peripheral Component Interconnect (PCI) bus 110. A Small Computer Systems Interface (SCSI) controller 114 and a video interface 116 are coupled to the PCI bus 110. The SCSI controller 114 interfaces the PCI bus 110 to a SCSI bus 120 which has coupled to it a hard disk drive 122 and a CD ROM drive 124. The video interface 116 is coupled to a monitor 118.

A PCI-Extended Industry Standard Architecture (EISA) circuit 112 couples the PCI bus 110 to an EISA bus 126. A keyboard/mouse controller 130 interfaces the EISA bus 126 to a keyboard 132 and a mouse 134. The keyboard/mouse controller 130 communicates with other peripheral devices (e.g., the battery pack 138) over an I²C bus 150. When AC power is available from an external AC power source, an AC/DC converter 128 furnishes power to a positive input line 140a of a DC/DC converter 136. The battery pack 138 also furnishes power to the input line 140a, and when AC power is available, any residual power that is available from the AC/DC converter 128 is used to charge the battery pack 138 when the computer system 10 is turned on. A negative input line 140b of the DC/DC converter 136 is connected to ground, and the DC/DC converter 136 is coupled to the EISA bus 126. The DC/DC converter 136 furnishes power to the computer system 10 via power lines 141.

Figure 3:
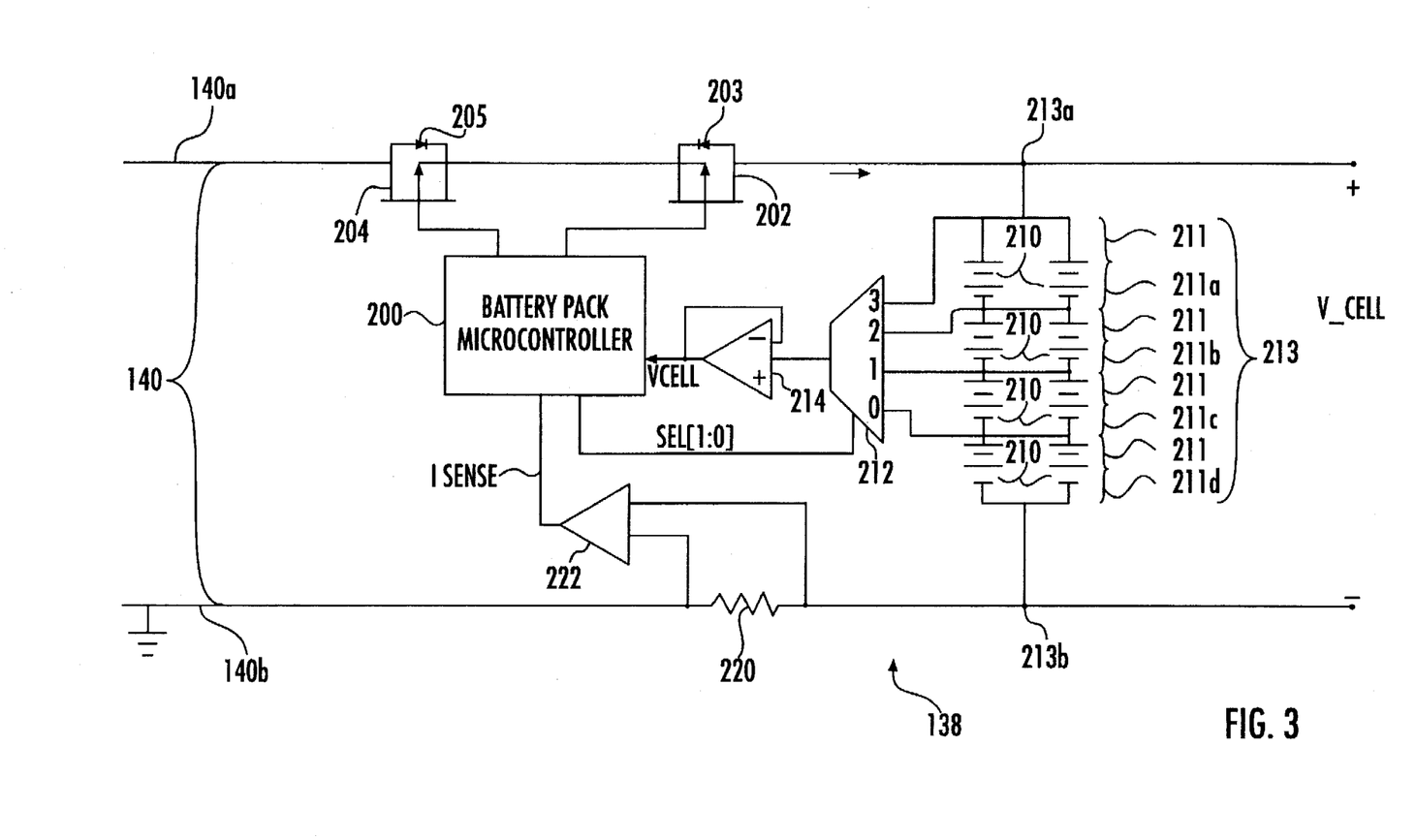
FIG. 3 is a schematic diagram of the battery pack of FIG. 2.

As seen in FIG. 3, the cells 210 are arranged in a cell unit 213 having four cell banks 211a–d connected in series. Each cell bank 211 has two cells 210 connected in parallel. When charging the cells 210, the battery pack 138 receives power from the AC/DC converter 128 and furnishes a pulsed charging current I_CELLS to the cell banks 211a–d.

As seen in FIGS. 4–5, it has been found to be permissible to allow the terminal voltage of each of the cells 210 to exceed a manufacturer specified, critical voltage level V_THRESH because, during charging, an internal electrochemical potential E of each of the cells 210 remains below the critical voltage threshold level V_THRESH until the cells 210 are fully charged at time $T_C$. The difference between the observed terminal voltage of one of the cells 210 and the internal potential E is attributable to the product of the cell's 210 internal resistance 612 and the charging current flowing through the cell 210 being charged.

When the pulsed charging current I_CELLS is pulsed high, a terminal voltage of one or more of the cell banks 211a–d is permitted to exceed the voltage threshold level V_THRESH by the amount specified below. Conventional lithium ion cell charging systems limit, or clamp, the terminal voltages of the cell banks 211a–d to the voltage threshold level V_THRESH.

When the pulsed charging current I_CELLS is removed at the end of each pulse, the terminal voltages of the cells 210 return to their electrochemical potential E. For purposes of assuming that the electrochemical potential E does not exceed the critical voltage threshold level V_THRESH, the terminal voltages of the cell banks 211a–d are monitored when the current I_CELLS is removed from the cell banks 211a–d, i.e., between pulses.

Figure 6:
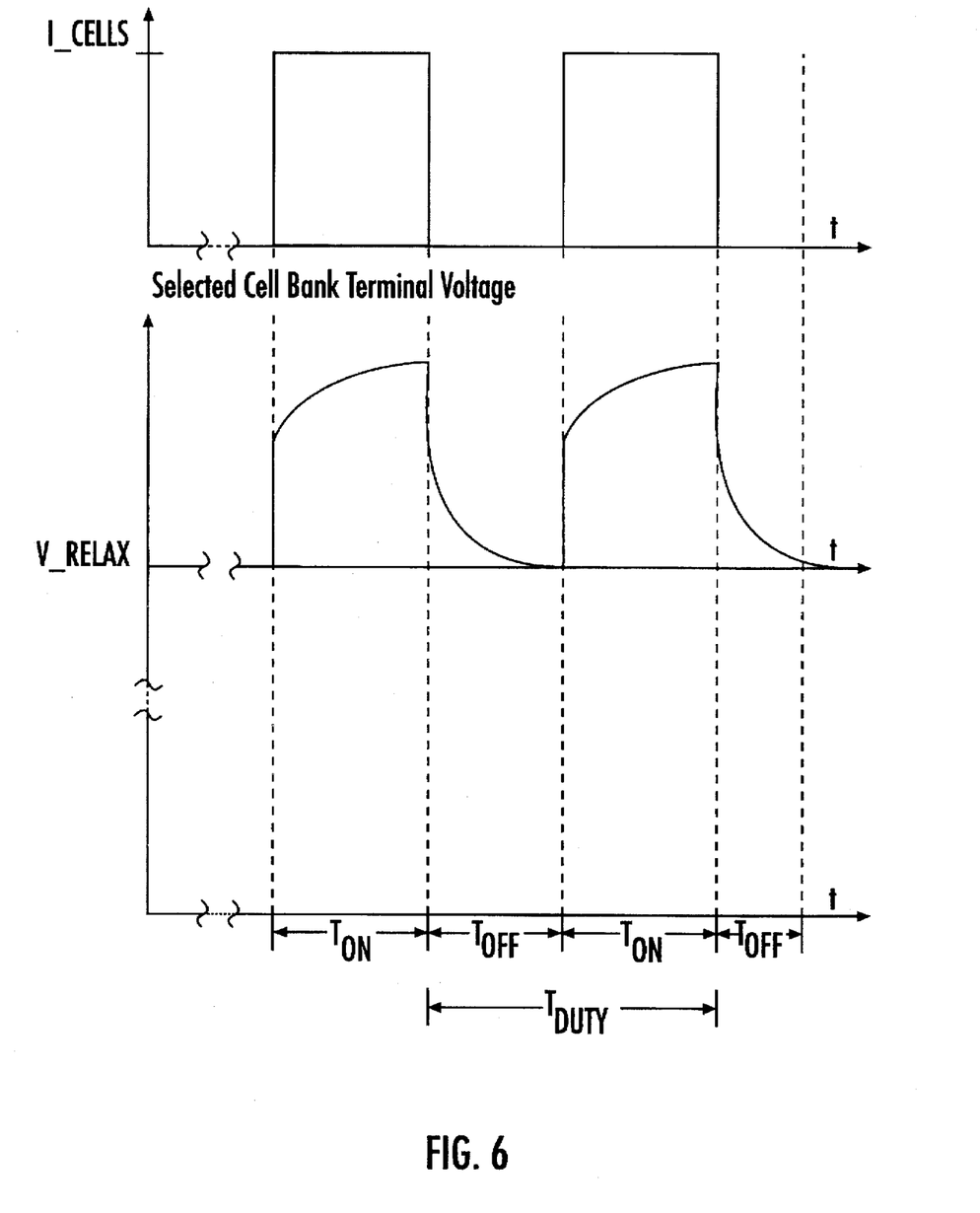
FIG. 6 are graphs showing waveforms for a battery cell being charged.

Control of the charging current I_CELLS is done by a microcontroller 200 (FIG. 3) of the battery pack 138 as follows. During an initial stage of charging, the microcontroller 200 allows the charging current I_CELLS to continuously (not pulsed) flow until the terminal voltage of one of the cell banks 211a–d reaches the threshold voltage level V_THRESH at time $T_O$. Alternatively, the microcontroller 200 may allow continuous charging to continue beyond V_THRESH when one of the cell banks 211a–d exceeds the voltage level V_THRESH as long as the charging current I_CELLS is large enough such that the potential E does exceed the voltage level V_THRESH. The microcontroller 200 then begins a series of successive pulse cycles with all cycles having a predetermined duty cycle time interval $T_{DUTY}$ (FIG. 6).

Each pulse cycle has an off time interval $T_{OFF}$ during which the battery pack 138 inhibits the flow of the charging current I_CELLS and allows the terminal voltage of at least one of the cell banks 211a–d to level off to a relaxation voltage level V_RELAX which is close to and falls slowly to be exactly the potential E. The relaxation voltage level V_RELAX is the voltage of one of the cell banks 211a–d measured at a fixed point in time (a time interval $T_{OFF}$ after the charge pulse is turned off). When the voltage level V_RELAX is reached at the end of the interval $T_{OFF}$, the microcontroller 200 triggers the beginning of the next pulse cycle during which the microcontroller 200 allows the charging current I_CELLS to flow for an on time interval $T_{ON}$ of the pulse cycle. The microcontroller 200 subsequently inhibits the flow of the charging current I_CELLS which begins another off time interval $T_{OFF}$ and another pulse cycle.

The on time interval $T_{ON}$ and the off time interval $T_{OFF}$ comprise the duty cycle time interval $T_{DUTY}$. Therefore, the microcontroller 200 determines the on time interval $T_{ON}$ by subtracting the off time interval $T_{OFF}$ from the duty cycle time interval $T_{DUTY}$.

As seen in FIG. 4, the relaxation voltage level V_RELAX increases and the off time interval $T_{OFF}$ increases with successive pulse cycles. As the off time interval $T_{OFF}$ increases with successive pulse cycles, the on time interval $T_{ON}$ decreases accordingly. The pulse cycles continue until the cells 210 are deemed fully charged when the measured relaxation voltage level V_RELAX from one of the cell banks 211a–d reaches the critical voltage threshold level V_THRESH. The microcontroller 200 determines the off time interval $T_{OFF}$ by multiplying a terminal voltage V_CELLS of the complete cell unit 213 by a constant.

As shown in FIG. 3, the battery pack 138 includes a P-channel, metal-oxide-semiconductor field-effect-transistor (MOSFET) 202 that furnishes the charging current I_CELLS at its drain terminal and is controlled by the microcontroller 200. The transistor 202 has its source-drain current path coupled between the positive input line 140a and a positive terminal 213a of the cell unit 213. When the microcontroller 200 asserts, or pulls low, a charging signal CHARGE# furnished to the gate of the transistor 202, the transistor 202 conducts and then the charging current I_CELLS flows to the cell unit 213. When the microcontroller 200 deasserts, or drives high, the charging signal CHARGE#, the transistor 202 inhibits the flow of the charging current I_CELLS. In this way, the microcontroller 200 can control the start and end of each time interval $T_{OFF}$ and $T_{ON}$.

The microcontroller 200 selectively monitors the voltages of the cell banks 211a–d through a four input multiplexer 212 which has four signal inputs. Each of the inputs of the multiplexer 212 is coupled to the positive terminal of different ones of the cell banks 211a–d. The select input of the multiplexer 212 receives a two bit select signal SEL[1:0] from the microcontroller 200. The output of the multiplexer 212 is coupled to a unity gain voltage buffer circuit 214 which furnishes a cell voltage signal VCELL to the microcontroller 200 that is indicative of the voltage at the positive terminal selected by the multiplexer 212. The microcontroller 200 determines the terminal voltage of any one cell bank 211 by selectively measuring and subtracting the positive terminal voltages of the cell banks 211a–d.

In order to supply power to the computer system 10, the microcontroller 200 controls the discharging of the cells 210 through a P-channel, MOSFET 204 which has its current drain-source path coupled between the positive input line 140a and the source of the transistor 202. When the microcontroller 200 asserts, or negates, a discharging signal DISCH# furnished to the gate of the transistor 204, discharge current flows through the transistor 204. When the microcontroller 200 deasserts, or drives high, the discharging signal DISCH#, the discharge current does not flow.

When the charging signal CHARGE# is asserted, the charging current I_CELLS flows from the positive input line 140a to the negative terminal 213a through a diode 205. The anode of the diode 205 is connected to the drain of the transistor 204, and the cathode of the diode 205 is connected to the source of the transistor 204. When the discharging signal DISCH# is asserted, the discharging current flows initially from the positive terminal 213a to the positive terminal line 140a through a diode 203. Subsequent to the assertion of the discharging signal DISCH#, the charging signal CHARGE# is asserted to shunt the diode 203 with the drain-source path of the transistor 202 and reduce power losses attributable to the diode 203. The anode of the diode 203 is connected to the drain of the transistor 202, and the cathode of the diode 203 is connected to the source of the transistor 202. The diodes 203 and 205 may either be intrinsic or extrinsic to the transistors 202 and 204, respectively.

For purposes of monitoring current flowing through the battery cell unit 213, a current sensing resistor 220 is in series with a negative terminal 213b of the cell unit 213 and ground. An amplifier 222 has its input coupled to the resistor and furnishes a current sensing signal ISENSE to the microcontroller 200.

Figure 7:
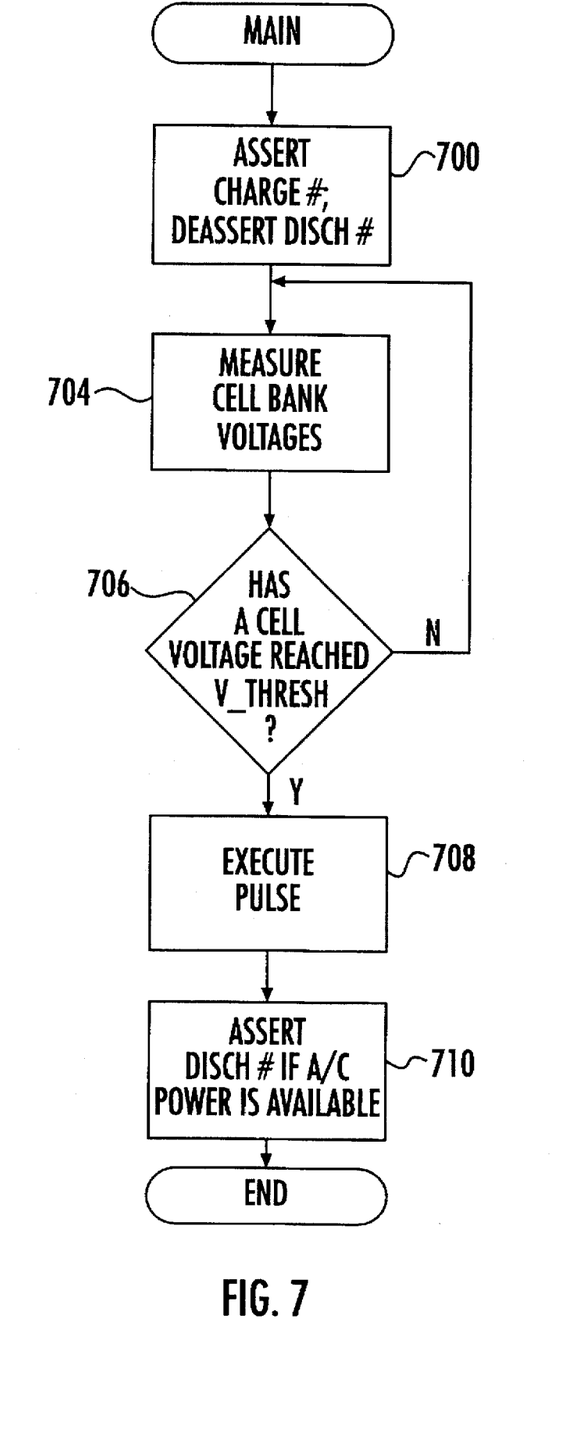
FIGS. 7–8 are flow diagrams of battery cell charging routines.

As shown in FIG. 7, when the microcontroller 200 begins charging the cell unit 213, the microcontroller 200 asserts 700 the charging signal CHARGE# and deasserts 700 the discharging signal DISCH#. The microcontroller 200 then measures 704 the terminal voltages of the cell banks 211a–d until the microcontroller 200 determines 706 that one of the measured terminal voltages has reached the threshold voltage level V_THRESH (Time $T_O$). Then, the microcontroller 200 executes 708 a routine called PULSE which controls the pulse charging cycles. After the cell unit 213 is charged, if AC power is not available, the microcontroller 200 asserts the discharging signal DISCH# allowing the cell unit 213 to furnish power to the computer system 10.

Figure 8:
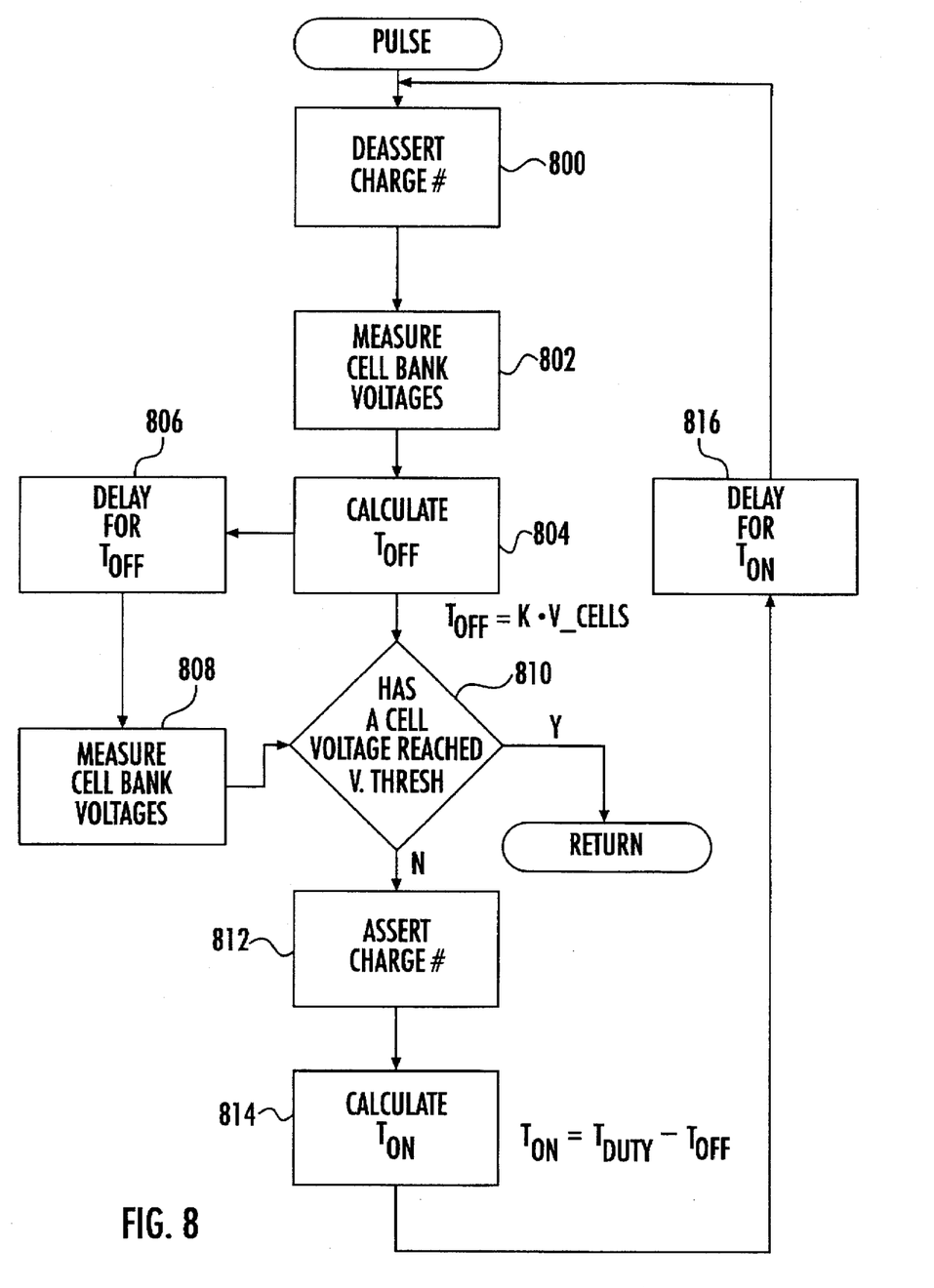

As shown in FIG. 8, during execution of the PULSE routine, the microcontroller 200 deasserts 800 the charging signal CHARGE# and then measures 802 the terminal voltages of the cell banks 211a–d. The microcontroller 200 then calculates 804 the off time interval $T_{OFF}$ by multiplying the terminal voltage V_CELLS of the complete cell unit 213 by a constant. Consequently, the lower the terminal voltage V_CELLS, or more depleted the cell banks 211a–d, the shorter the off time interval $T_{OFF}$ or longer the on time interval $T_{ON}$. The microcontroller 200 then delays 806 for the off time interval $T_{OFF}$ and subsequently measures 808 the terminal voltages of the cell banks 211a–d again.

If the microcontroller 200 determines 810 that one of the measured terminal voltages has reached the threshold voltage level V_THRESH, then the routine PULSE is terminated because the battery is fully charged. Otherwise, the microcontroller 200 asserts 812 the charging signal CHARGE# to begin the next interval $T_{ON}$ and calculates 814 the on time interval $T_{ON}$ which is the difference of the duty cycle time interval $T_{DUTY}$ and the previously calculated off time interval $T_{OFF}$. The microcontroller 200 then delays 816 for the on time interval $T_{ON}$ before once again deasserting 800 the charging signal CHARGE#.

Figure 9:
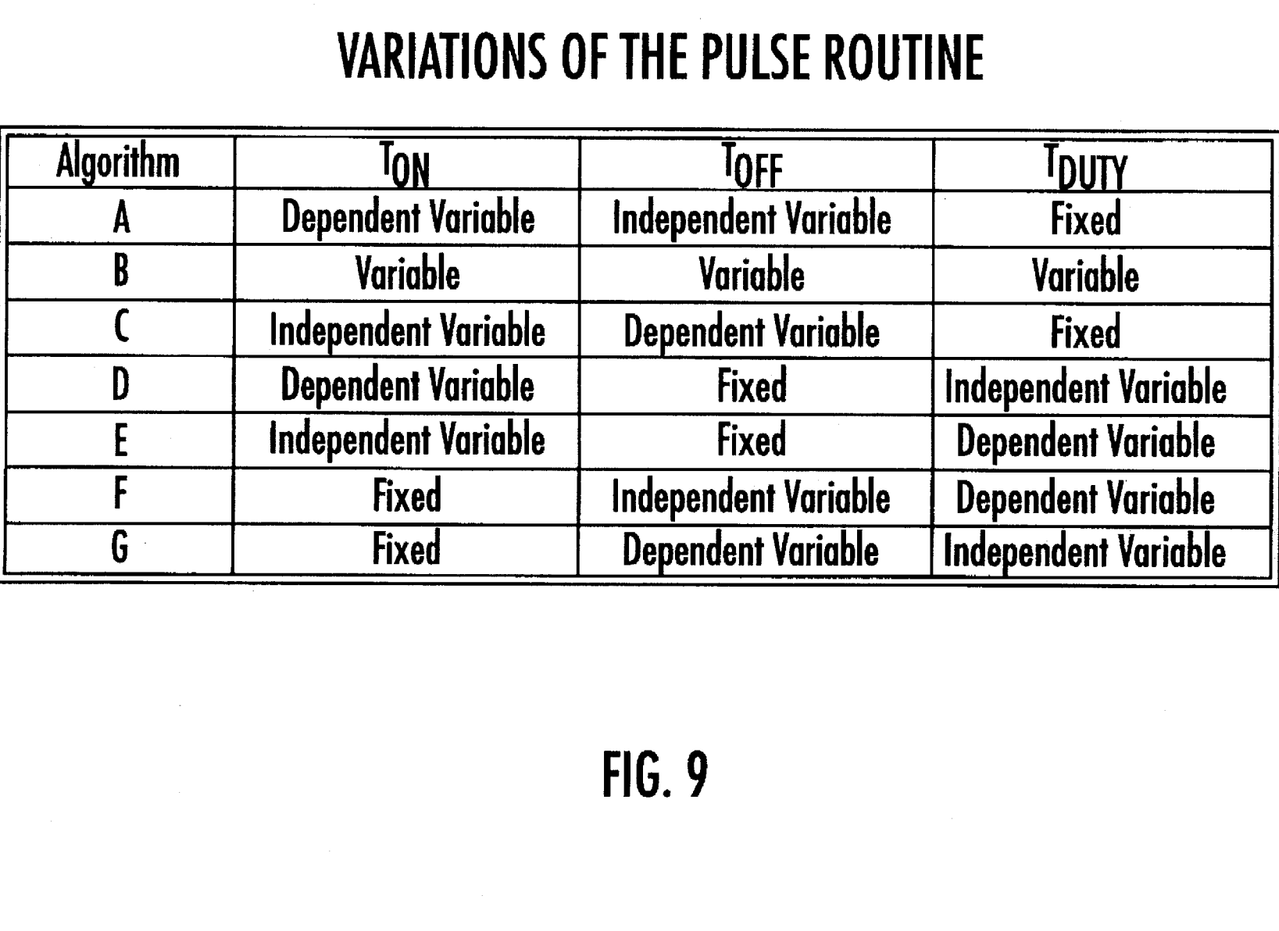
FIG. 9 is a chart illustrating battery cell charging routines.

Other embodiments are within the scope of the following claims. For example, as shown in FIG. 9, the functional relationship of the intervals $T_{DUTY}$, $T_{ON}$, and $T_{OFF}$ to each other and to circuit conditions (e.g., the cell unit voltage V_CELLS) can be varied as shown by algorithms A–G. For example, the PULSE routine described above (algorithm A) has the duty cycle interval $T_{DUTY}$ that is of a fixed duration, the interval $T_{OFF}$ that varies independently of the durations of the other time intervals (but is a function of the voltage V_CELLS), and the interval $T_{ON}$ that is dependent on the duration of the intervals $T_{OFF}$ and $T_{DUTY}$. In each of these cases, the pulse routine would be modified accordingly.

What is claimed is:

1. A method of charging a battery in a personal electronic device, the battery having a nominal critical terminal voltage that may not be exceeded without hazardous failure of the battery, the method comprising:

applying charging current to the terminals of the battery in the personal electronic device according to a time profile including intervals when the terminal voltage of the battery exceeds the nominal critical terminal voltage; and controlling the time profile to prevent hazardous failure of the battery in the personal electronic device.

2. The method of claim 1, wherein the step of controlling the time profile includes:

repeatedly cycling the charging voltage from higher levels that exceed the nominal rated critical terminal voltage to lower levels that are no higher than the nominal rated critical terminal voltage.

3. The method of claim 2, wherein the lower levels represent a relaxation voltage that rises over time to reach the nominal rated critical terminal voltage.

4. The method of claim 3, wherein the relaxation voltage represents a voltage at which the terminal voltage of the battery reaches a minimum.

5. The method of claim 1, wherein the time profile includes a series of current pulses each comprising an on period and an off period, and wherein the off period ends each time the terminal voltage of the battery falls to the relaxation voltage.

6. The method of claim 5, wherein the current pulses all have the same duty cycle, and wherein the lengths of the on periods decrease with time.

7. The method of claim 1, wherein the step of controlling the time profile includes monitoring the terminal voltage of the battery during charging and controlling the time profile based on the monitored terminal voltage.

8. The method of claim 1, wherein the charging current after an initial period is constant or off.

9. A method of charging a lithium ion battery in a personal electronic device, the battery having a nominal critical terminal voltage that may not be exceeded without hazardous failure of the battery, the method comprising:

converting energy into pulses of power; and charging the battery using the pulses of power to cause a terminal voltage of the battery to exceed the nominal critical terminal voltage.

10. A method of charging a battery in a personal electronic device, the battery having a nominal critical terminal voltage that may not be exceeded without hazardous failure of the battery, comprising:

applying a time profile of charging power to the battery, the time profile repeatedly cycling a terminal voltage of the battery from higher levels that exceed the nominal rated critical terminal voltage to lower levels that are no higher than the nominal rated critical terminal voltage;

measuring a relaxation voltage of the battery at times during the time profile; and continuing the time profile until the relaxation voltage reaches a predetermined level.

11. The method of claim 10, wherein the lower levels represent a relaxation voltage that rises over time to reach the nominal rated critical terminal voltage.

12. The method of claim 11, wherein the relaxation voltage represents the voltage at which the terminal voltage of the battery reaches a minimum.

13. The method of claim 10, wherein the time profile includes a series of current pulses each comprising an on period and an off period, and wherein the off period ends each time the terminal voltage of the battery falls to the relaxation voltage.

14. The method of claim 13, wherein the current pulses all have the same duty cycle, and wherein the lengths of the on periods decrease with time.

15. A method of charging a battery, the battery having a nominal rated critical terminal voltage that may not be exceeded without hazardous failure of the battery, the method comprising the steps of:

applying a time profile of charging power to the terminals of the battery, the profile including the portions when the terminal voltage of the battery exceeds the nominal rated critical terminal voltage; and controlling the time profile to prevent hazardous failure of the battery.

16. A method of charging a lithium ion battery, the battery having a nominal critical terminal voltage that may not be exceeded without hazardous failure of the battery, the method comprising:

converting energy into pulses of power; and charging the battery using the pulses of power to cause a terminal voltage of the battery to exceed the nominal critical terminal voltage.

17. A personal electronic device capable of receiving power from an external power source, the device comprising:

a microprocessor;

a memory;

a system bus; and a rechargeable battery pack including a battery having a nominal rated critical terminal voltage that may not be exceeded without hazardous failure of the battery; and a controller for routing power from the power source to the battery to recharge the battery, the controller being configured to apply a time profile of charging power to the terminals of the battery in the personal electronic device, the profile including time portions when the terminal voltage of the battery exceeds the nominal rated critical terminal voltage, and to control the time profile to prevent hazardous failure of the battery in the personal electronic device.

18. The personal electronic device of claim 17, wherein the controller includes a microprocessor.

19. The personal electronic device of claim 17, wherein the controller includes switches.

20. The personal electronic device of claim 17, wherein the controller includes a voltage detector.

21. The personal electronic device of claim 17, where the personal electronic device is a personal computer.

22. A personal electronic device capable of receiving power from an external power source, the device comprising:

a microprocessor; and a rechargeable battery pack including:

a lithium ion battery, the battery having a nominal critical terminal voltage that may not be exceeded without hazardous failure of the battery; and a controller for routing power from the power source to the battery to recharge the battery, the controller being configured to charge the battery using pulses of power and cause a terminal voltage of the battery to exceed the nominal critical terminal voltage.

23. The personal electronic device of claim 22, wherein the controller includes a microprocessor.

24. The personal electronic device of claim 22, wherein the controller includes switches.

25. The personal electronic device of claim 22, wherein the controller includes a voltage detector.

26. The personal electronic device of claim 22, where the personal electronic device is a personal computer.

27. A personal electronic device capable of receiving power from an external power source, the device comprising:

a microprocessor; and a rechargeable battery pack including:

a battery having a nominal critical terminal voltage that may not be exceeded without hazardous failure of the battery; and a controller for routing power from the power source to the battery, the controller being configured to apply a time profile of charging power to the battery, the time profile repeatedly cycling a terminal voltage of the battery from higher levels that exceed the nominal rated critical terminal voltage to lower levels that are no higher than the nominal rated critical terminal voltage, measure a relaxation voltage of the battery at times during the time profile, and continue the time profile until the relaxation voltage reaches a predetermined level.

28. The personal electronic device of claim 27, wherein the controller includes switches.

29. The personal electronic device of claim 27, wherein the controller includes a voltage detector.

30. The personal electronic device of claim 27, where the personal electronic device is a personal computer.

31. The personal electronic device of claim 27, wherein the controller includes a microprocessor.

32. A battery pack capable of receiving power from an external power source, the battery pack comprising:

a battery having a nominal rated critical terminal voltage that may not be exceeded without hazardous failure of the battery; and a controller for routing power from the power source to the battery to recharge the battery, the controller being configured to apply a time profile of charging power to the terminals of the battery, the profile including time portions when the terminal voltage of the battery exceeds the nominal rated critical terminal voltage, and to control the time profile to prevent hazardous failure of the battery.

33. A battery pack capable of receiving power from an external power source, the battery pack comprising:

a lithium ion battery, the battery having a nominal critical terminal voltage that may not be exceeded without hazardous failure of the battery; and a controller for routing power from the power source to the battery to recharge the battery, the controller being configured to charge the battery using pulses of power and cause a terminal voltage of the battery to exceed the nominal critical terminal voltage.

34. A battery pack capable of receiving power from an external power source, the battery pack comprising:

a battery having a nominal critical terminal voltage that may not be exceeded without hazardous failure of the battery; and a controller for routing power from the power source to the battery, the controller being configured to apply a time profile of charging power to the battery, the time profile repeatedly cycling a terminal voltage of the battery from higher levels that exceed the nominal rated critical terminal voltage to lower levels that are no higher than the nominal rated critical terminal voltage, measure a relaxation voltage of the battery at times during the time profile, and continue the time profile until the relaxation voltage reaches a predetermined level.

* * * * *